3,464,003
Patented Aug. 26, 1969

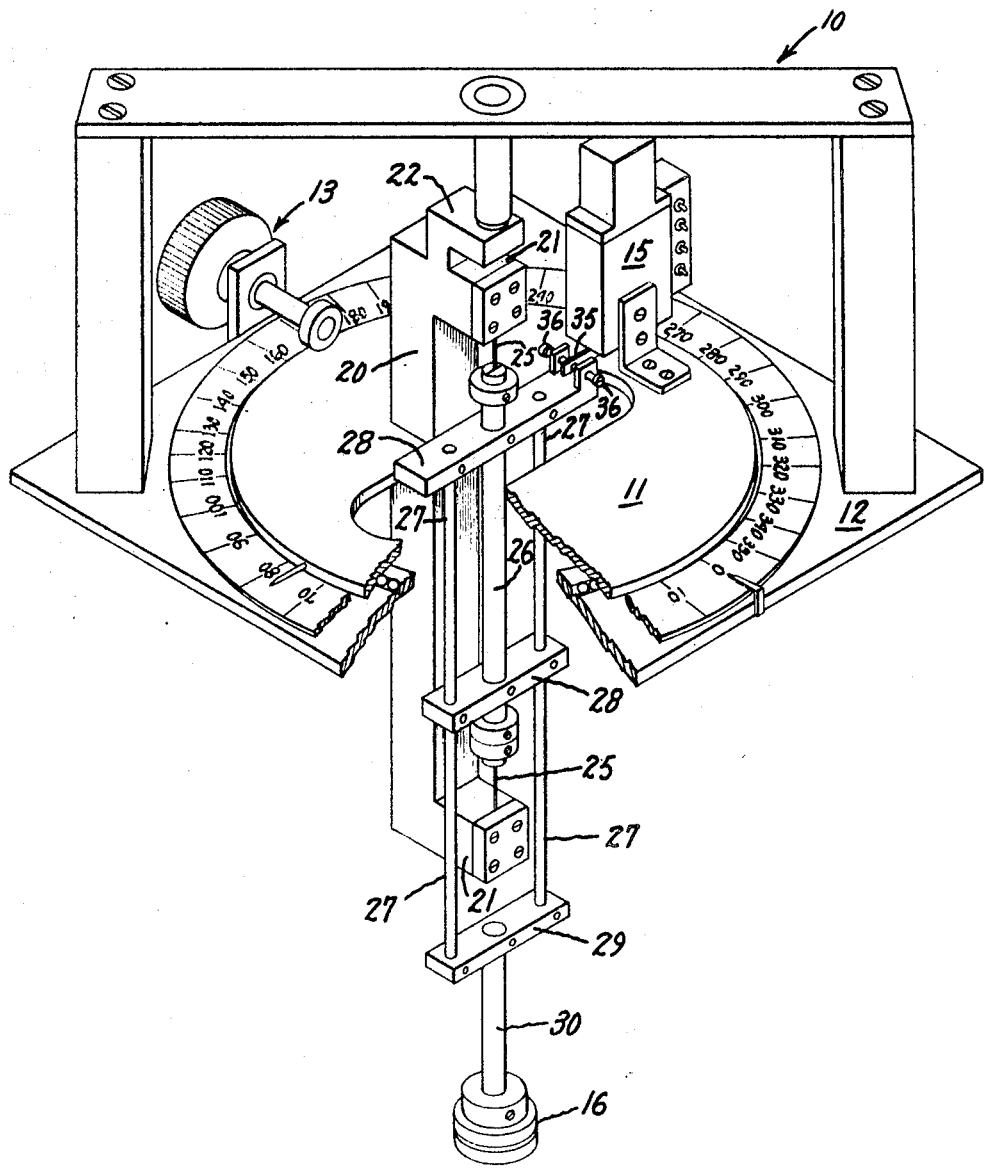

3,464,003
TORQUE MAGNETOMETER WITH TORSION FIBER SUSPENSION
Joseph J. Becker, Schenectady, N.Y., assignor to General Electric Company, a corporation of New York
Filed Nov. 22, 1966, Ser. No. 596,126
Int. Cl. G01r 33/02
U.S. Cl. 324—43                                    1 Claim

ABSTRACT OF THE DISCLOSURE

A torque magnetometer is described in which the holder for the magnetic sample to be tested is operably connected to a rotatable instrument platform by means including torsion fibers. The torsion fibers, which replace the usual bearings, permit the sample to rotate slightly with respect to the instrument platform. This slight rotation is resisted by the strain transducer, whose output is proportional to the torque on the specimen.

---

Torque magnetometers have been widely used and highly valuable instruments for measuring the anisotropic properties of various types of magnetic materials. The general method of operation comprises placing a disk of the magnetic material in a transverse magnetic field and then rotating the disk relative to the magnetic field, in order to obtain a measurement of the torque on the disk as a function of its angular position in the field. The disk is frequently connected to a rotatable stage, which stage carries a strain transducer. The sample disk is mounted on a vertically extending shaft that is attached to the instrument stage but, by means of appropriate bearing mounts, is free to rotate with respect thereto. The disk on which the sample is mounted is at some appropriate location and is operatively connected to the strain transducer, it being this operative connection that makes it possible to determine the degree of torque required to hold the disk in preselected positions in the applied magnetic field. Unfortunately, the fact that bearings must be used in the construction of existing torque magnetometers has introduced varying degrees of error due to the inherent frictional losses.

It is a principal object of this invention to provide an improved torque magnetometer which has a wide range of sensitivity and good lateral and angular stability.

Another object of this invention is to provide an improved torque magnetometer in which the usual bearings are replaced by frictionless torsion fibers.

Other objects and advantages of this invention will be in part obvious and in part explained by reference to the accompanying specification and drawings.

In the drawings:

The figure is a perspective view, with parts broken away for clarity, of a torque magnetometer in accordance with this invention.

Generally, the improved torque magnetometer here involved includes an instrument platform which is mounted for rotation on an appropriate supporting structure. The instrument plaform has a strain transducer mounted on it in the manner common to previously existing magnetometers. A holder for the magnetic sample to be measured is present and it is operably connected to the rotatable instrument platform by improved means which includes, as important parts, a pair of torsion fibers which provide a frictionless axis of rotation for the sample. The use of these torsion fibers eliminates frictional losses previously caused by the presence of bearings.

The precise construction of the device may be seen more clearly by referring to the drawing where the numeral 10 indicates the overall magnetometer. Magnetometer 10 includes an instrument platform 11 which is mounted for rotation on supporting structure 12, which also may include a 360° compass for measuring the angular position of instrument platform 11. The instrument platform 11 can be rotated in either direction by the knob and drive-wheel assembly 13 mounted on the supporting structure 12. It will be appreciated that the entire magnetometer including supporting structure 12 is normally supported by additional structure which locates the sample within the field of a magnet. However, such supporting structure does not constitute part of this invention, and, for purposes of clarity, has not been shown in the drawing.

The magnetometer 10 also includes a strain transducer 15 which is secured to the surface of instrument platform 11 for rotation therewith. This strain transducer is, of course, electrically connected to suitable amplifying and recording apparatus in accordance with standard existing practices.

As viewed in the drawings, that portion of the magnetometer that holds the sample to be measured is identified by the numeral 16. Holder 16 is constructed of a nonmagnetic material and is adapted to receive a circular disk which is then located within a transversely applied magnetic field. Obviously, sample shapes other than disks can be used effectively. The sample holder 16 is connected to the platform 11 by means including a mounting member 20.

The member 20 extends generally vertically and has clamping projections 21 at its upper and lower ends, these projections extending generally parallel to the plane of platform 11.

It was earlier indicated that an important aspect of the present torque magnetometer is the use of torsion fibers to assure sensitive, yet rugged operation. These torsion fibers are indicated by the numeral 25 and are clamped at one end in the clamping projections 21 and at the other ends are attached to a vertically extending torsion rod 26. The fibers in this instance are about one-half inch in length, have a diameter of 0.008 inch and are made of tungsten. Other sizes and metals may be used.

The means operably connecting the sample holder 16 to the torsion rod 26 comprises a pair of bar-like members 27 which extend generally parallel to the torsion rod but which are of greater length so that they extend beyond the lower of the clamping projections 21, as viewed in the figure. A pair of tie-plates 28 join the torsion rod 26 to the bar-like members 27 and a single tie-plate 29 is used to join the bar-like members 27 together outside of the projections 21. Means, such as the rod 30, is provided to secure the sample holder 16 to the single tie-plate 29. It should be noted that the sample holder 16 is secured to tie-plate 29 in such a way that the axis of the sample coincides with the axis of the torsion rod 26.

In operation, a circular disk of an anisotropic magnetic material is placed within the sample holder 16 with the magnetometer appropriately positioned so that a magnetic field can be applied transversely to the sample contained within the holder. With this positioning, the operator assembly 13 is used to rotate the instrument platform 11 thereby causing the mounting member 20 to rotate along with the platform mounted strain transducer 15. As this occurs, the operating finger 35 on the strain transducer strikes one or the other of the pressure contacts 36. This contact occurs as the result of torque arising from holding the sample at any given position in the applied field. Varying amounts of torque will be required to maintain the anisotropic sample in the magnetic field so that the pressure being sensed by transducer 15 will be of different values. These differences once sensed by the transducer can be recorded on the usual type of amplifying and recording apparatuses.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claim.

What I claim as new and desire to secure by Letters Patent of the United States is:

1. In a torque magnetomer including an instrument platform mounted for rotation about a substantially vertical axis, a strain transducer mounted on said platform, a holder for a magnetic sample to be measured, means connecting the sample holder to said platform comprising a mounting member attached to the platform having a pair of vertically spaced clamping projections extending generally parallel to the plane of the platform, a torsion rod located between the clamping projections, a pair of non-magnetic torsion fibers attached to each end of said torsion rod and to the clamping projections to secure said torsion rod in position between said projections, the axis of said torsion rod and of said fibers coinciding with the axis of rotation of said instrument platform, and means operably connecting said sample holder to said torsion rod comprising a pair of bar-like members extending generally parallel to said torsion rod but being of greater length, a pair of tie-plates joining said torsion rod to said bar-like members, a third tie-plate joining said bar-like members below the lower of said clamping projections, and means securing the sample holder to said third tie-plate, the axis of said holder coinciding with the axis of rotation of said torsion rod and said instrument platform.

References Cited

UNITED STATES PATENTS

| | | | |
|---|---|---|---|
| 2,507,301 | 5/1950 | Fulbright | 324—43 |
| 2,574,795 | 11/1951 | Miller | 324—14 |

FOREIGN PATENTS

| | | |
|---|---|---|
| 861,357 | 2/1961 | Great Britain. |

OTHER REFERENCES

Buchner, H.: Ein einfacher Apparat zur Messung Magnetischer Feldstärken mittels Wirbelströmen, Physikalishe Zeitschrift, May 15, 1934, pp. 409–410.

Day et al.: Counter Torque Quartz-Fiber Adaptation of the Curie-Chéneveau Type Magnetic Balance, Review of Scientific Instruments, vol. 31, No. 10, October 1960, pp. 1142–1145.

RUDOLPH V. ROLINEC, Primary Examiner

R. J. CORCORAN, Assistant Examiner

U.S. Cl. X.R.

324—14